United States Patent [19]

Gracin et al.

[11] 3,717,056
[45] Feb. 20, 1973

[54] PIPE CUTTING TOOL

[75] Inventors: William J. Gracin; Roy Lee Jones, both of Carmichael, Calif.

[73] Assignee: Raymond L. Stanford, Sacramento, Calif. ; a part interest

[22] Filed: July 2, 1970

[21] Appl. No.: 51,907

[52] U.S. Cl. ............................................. 82/82, 82/4 C
[51] Int. Cl. .......... B23b 3/04, B23b 3/22, B23b 5/14
[58] Field of Search ................................. 82/82, 4 C

[56] References Cited

UNITED STATES PATENTS

| | | | |
|---|---|---|---|
| 3,355,972 | 12/1967 | Janik | 82/82 |
| 700,118 | 5/1902 | Hathorn | 82/82 |
| 3,216,295 | 11/1965 | Gill | 82/82 |
| 3,247,743 | 4/1966 | Frost et al. | 82/4 C |

Primary Examiner—Harrison L. Hinson
Attorney—Clarence A. O'Brien and Harvey B. Jacobson

[57] ABSTRACT

A shiftable and positionable tool characterized by an arbor having a removable saw blade of a diameter slightly less than the inside diameter of an embedded plastic sewer pipe. The lower end of the arbor has guide means proportional with the diameter of the blade and so mounted that its outer marginal edge rolls in an orbital path and functions to prevent the teeth of the blade from gouging into the concrete or equivalent foundation. Depth regulating and controlling means is adjustably mounted on a median portion of the arbor. An upper terminal end of the sewer pipe is cut-off parallel to the level of the floor at a controlled depth below the floor's level whereby to prepare the pipe-end for installation of a plumbing adapter in a sewage system.

8 Claims, 3 Drawing Figures

PATENTED FEB 20 1973

3,717,056

William J. Gracin
Roy Lee Jones
INVENTORS

BY Clarence A. O'Brien
and Harvey B. Jacobson
Attorneys

PIPE CUTTING TOOL

This invention relates to a special-purpose motor-driven manually positionable and shiftably supported tool which lends itself to satisfactory and successful use in the plumbing trade in that it enables one who is experienced with motor-driven tools to expeditiously sever the upper end of an embedded plastic sewer pipe and to recess and prepare the area for adequate installation of a prescribed plumbing adapter.

The power is preferably derived from an easy-to-handle drill motor. The depth of insertion of the cutter-equipped arbor is preset and determined and maintained by depth regulating and controlling means. With the cutter-equipped end of the arbor inserted to the depth desired, and with the motor running, force is applied to present and maintain an endless marginal cutting edge of guide means against the bore of the pipe and by applying clockwise rotation to the tool the pipe can be cut a full 360° in a single orbital rotation. It follows that the area proximal to the severed upper end of the plastic pipe is thus prepared with requisite nicety that the desired toilet hook-up can be expeditiously and reliably attained.

Briefly the tool embodies a rigid arbor of requisite length and cross-section which has a leading lower end which is adapted to be axially aligned with and inserted into an end of the bore of said pipe. The arbor also has an upper end which is provided with suitable means whereby said arbor can be operatively rotated, usually by the aforementioned drill motor. Pipe cutting means is operatively mounted on the lower end of the arbor and depth regulating and controlling means is adjustably mounted on a median portion of the arbor and embodies a limit stop member, usually a flat-bottomed abutment or plate, and which is adapted to abut and rest upon the stationary floor or other support surface in a manner to establish and maintain the locale of the cutting means relative to the inside diameter of the severable pipe.

More explicitly the pipe cutting means is characterized by a rotary saw blade which is mounted on the lower end of the arbor in a plane at right angles to the longitudinal axis of the arbor, said blade being of a diameter slightly less than the diameter of the bore of the pipe. Then, too, the cutting means also comprises guide means which is likewise mounted on the lower end and which has a free marginal edge which is adapted to come into movable contact with the inner wall of the bore and, in so doing, serves to check and limit the thickness-cutting-action of the saw blade, whereby to not only controllably gauge the cleaving action of the blade but to prevent the teeth of the blade form colliding with and gouging into the concrete foundation or other media surrounding and in which the pipe is embedded.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
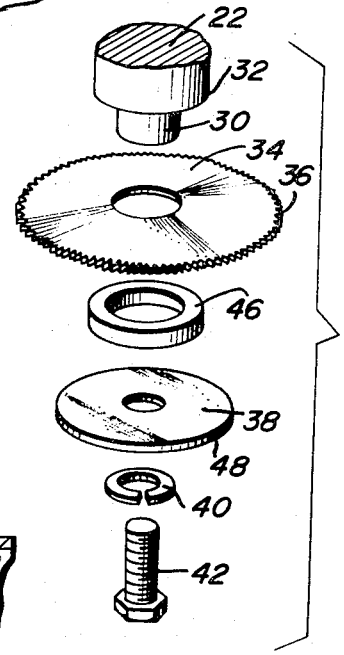

And FIG. 3 is an exploded perspective view showing the cutting means and guide means which is removably mounted on the lower pipe-cutting end of the arbor.

Figure 1:
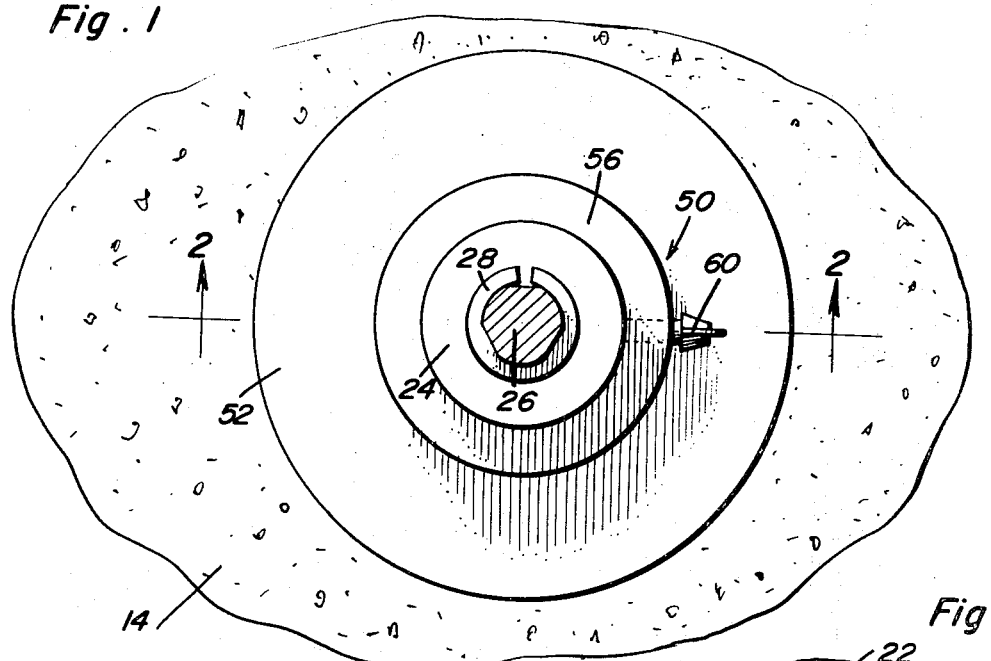
FIG. 1 is a top plan view of the improved cutting tool constructed in accordance with the invention and illustrating the manner in which it is intended to be used atop a concrete or equivalent floor.
Figure 2:
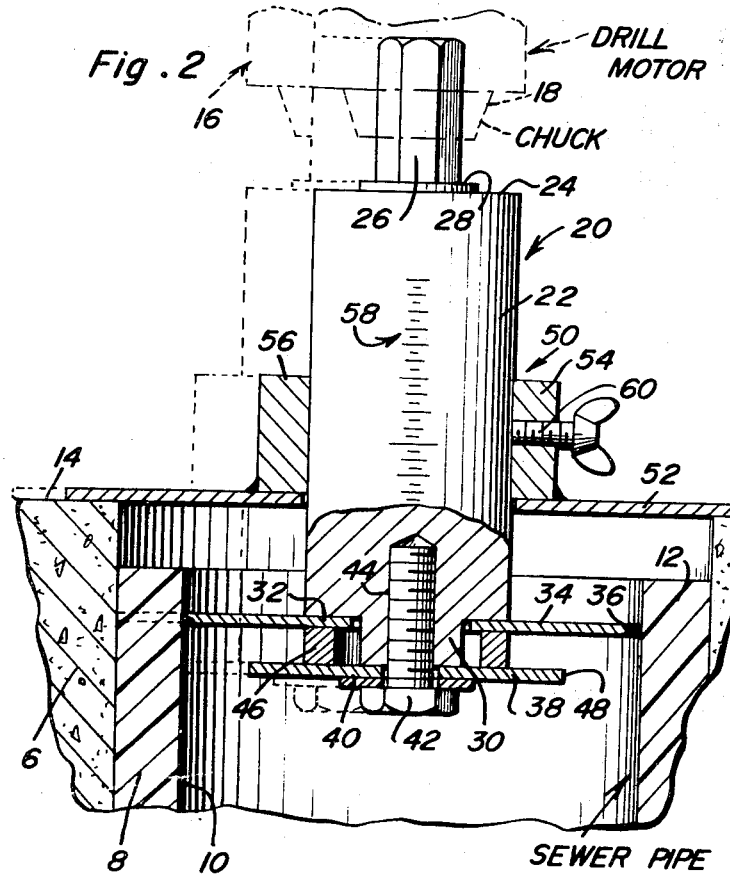
FIG. 2 is a view with parts in section and elevation which is taken on the plane of the section line 2—2 of FIG. 1, looking in the direction of the arrows, and which shows the tool in full lines and also in phantom lines to illustrate how it can be bodily shifted in order to initiate and maintain the desired pipe-end cutting step.

With reference first to FIG. 2 the numeral 6 designates a fragmentary portion of the concrete floor or other foundation and in which the aforementioned plastic sewer pipe 8 is embedded in the usual manner. The wall of the bore of the pipe is denoted at 10. The upper end portion of the pipe is denoted at 12 and as shown in phantom lines that portion which is to be severed and removed is denoted at the left (FIG. 2) in phantom lines. Normally the extreme upper end of the pipe is spaced below the level 14 of the concrete or other floor. The drill motor is denoted by the numeral 16 and the chuck by the numeral 18.

The over-all insertable, removable and positionable tool is denoted by the numeral 20. It comprises an elongated rigid arbor 22 of predetermined length and cross-sectional dimension. The upper flat end 24 is provided with an axial reduced flat-faced motion-transmitting shank 26 which in practice is adapted to be operatively fitted in the chuck 18. The numeral 28 designates an optionally usable washer. The insertable lower end of the arbor is reduced in cross-section to provide a neck-like extension 30 defining an encircling shoulder 32 for an applicable and removable centrally apertured saw blade 34. The teeth of the blade are denoted at 36. In actual practice the centrally apertured portion of the blade abuts the shoulder and surrounds the neck 30, the diameter of the blade being slightly less than the diameter of the bore 10 of the sewer pipe 8 as brought out in the usable position illustrated in FIG. 2. The complemental guide means preferably comprises a flat-faced rigid washer 38 the apertured portion of which abuts the end of the extension. A suitable split washer is provided at 40. This washer and apertured portion of the guide washer 38 is held in operative position by way of the headed end of a screw-threaded fastener or bolt 42. The shank of the bolt is threaded into a screw-threaded socket 44. A spacing ring 46 is provided and surrounds the neck and is interposed between the guide washer 38 and the spaced parallel cutter blade 34. The marginal outer edge 48 is spaced radially inward from the saw teeth and the diameter of the washer 38 is proportional with the diameter of the saw blade to permit the controlled and limit stop action desired and shown at the left in phantom lines in FIG. 2. The depth regulating and controlling means 50 is removably and adjustably mounted on the arbor. This means 50 comprises a centrally apertured rigid check plate 52 of requisite area and which has a flat bottom surface adapted to reside flatwise and firmly atop the floor or other foundation surface 14 as brought out in FIG. 2. This plate 52 has a centrally apertured portion encircling the arbor, said plate equipped with an upstanding rigid annular collar 54. The collar has its lower end fixedly mounted atop the plate 52 and its upper end 56 is flat and is disposed at right angles to the lengthwise dimension of the arbor to provide measuring means and to co-act with suitable graduations constituting the measuring scale 58. The collar is held in an adjusted position by way of a setscrew 60 carried by the collar and engaging the arbor.

As is believed to be clear from the view of the drawing, and the description of the details, the tool 20 is expressly and suitably designed for practical use in the plumbing trade. Power can be and is preferably derived from the drill motor 16 by way of the chuck and the stub shaft or shank 26 which is operatively mounted in the chuck. The desired depth of cut is preset by use of the depth control and regulating means 50, more particularly the abutment plate 52 contacting the floor surface 14 and the regulable collar 54 which snugly surrounds the scale-equipped portion of the arbor 22. With the cutter means on the tool inserted in the manner illustrated in FIG. 2, and with the motor-driven arbor turning force is applied to the contact edge 48 of the guide washer or means 38 and by clockwise rotation the pipe is cut a full 360° in a single rotation. A safety factor is achieved and maintained by way of the guide washer 38 mounted on the neck 30 at the lower end of the arbor. This adaptation and arrangement prevents any damage to the cutter when used in a pipe which is embedded in concrete such as is customarily the situation in a toilet hook-up.

It is believed that the construction and manner of use of the tool will be clear from the specification and views of the drawing. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An inside diameter plastic sewer pipe end-cutting and cleaving tool comprising, in combination: (a) a rigid elongated arbor having a lower end provided with a reduced neck-like extension, said extension providing a shoulder, said arbor having an upper end provided with means for operatively rotating the arbor; (b) a circular saw blade having a centrally apertured hub portion surrounding said extension and firmly abutting said shoulder for rotation with said arbor, said blade being of a diameter that an outer toothed edge thereof projects uniformly beyond the encompassed peripheral surface of said arbor, the diameter of said blade being slightly less than the inside diameter of the bore of the sewer pipe; (c) guide means including a circular washer abutting a terminal end of said extension for limiting the thickness cutting action of said blade; (d) means for securing the washer in a position parallel to said blade; (e) a spacing ring surrounding the extension and interposed between the washer and saw blade, respectively; and (f) depth regulating and controlling means removably and adjustably mounted on a median portion of said arbor for abutting and resting upon a support surface for establishing and maintaining the locale of the cutting tool relative to the pipe.

2. The tool defined in and according to claim 1, and wherein the means on said upper end comprises an axial outstanding shank having flat faces and which is adapted to be fitted into a drill motor chuck in a manner to rotate the arbor, depth regulating means and pipe cutting means.

3. The tool defined in and according to claim 1, and wherein said guide comprises a rigid annular washer which is removably fastened on said lower end, is spaced from, is parallel with said saw blade, and is of a diameter less than and is precisely proportional with the diameter of said saw blade to bring said edge into play precisely at the moment of completion of the severing step of said blade.

4. An inside diameter plastic sewer pipe end-cutting and cleaving tool comprising: a rigid elongated arbor having a lower end provided with a reduced neck-like extension and an axial screw-threaded socket, said extension providing a shoulder, said arbor having an upper end provided with an upstanding shank of a length and cross-section that it is designed and adapted to fit removably but retentively in the chuck of a drill motor, a rotary circular saw blade having a centrally apertured hub portion surrounding said extension and firmly abutting said shoulder, said blade being of a diameter that the outer toothed edge projects uniformly beyond the encompassed peripheral surface of said arbor, the diameter of said blade being slightly less than the inside diameter of the bore of the sewer pipe, guide means including a circular washer surrounding said extension and abutting the terminal end of said extension, for limiting the thickness cutting action of said blade a headed screw-threaded assembling and retaining fastener screwed into said socket and securing the washer in a position parallel to said blade, a spacing ring surrounding the extension and interposed between the washer and saw blade, respectively, and depth regulating and controlling means removably and adjustably mounted on a median portion of said arbor for abutting and resting upon a support surface for establishing and maintaining the locale of the cutting tool relative to the pipe.

5. The tool defined in and according to claim 4, and wherein said washer is of an exact predetermined diameter less than and precisely proportional with the diameter of said saw blade whereby the outer marginal gauging and guiding edge is concentric with toothed cutting edge of the saw blade and is disposed radially inward in such a manner and at such a distance that it will abut the interior surface of the bore of said pipe and will perform its limit stop function at the precise moment that the toothed edge of the blade cleaves through the severable pipe and so that said toothed cutting edge cannot collide with and gouge into the concrete or other foundation surrounding and into which said pipe is embedded.

6. The tool defined in and according to claim 5, and wherein said depth regulating and control means comprises a centrally apertured rigid check plate having a flat bottom surface which is adapted to reside flatwise and firmly atop the floor or other support surface, a prescribed portion of said arbor passing downwardly through and beyond the aperture in said plate, and a collar snugly but slidingly surrounding a significant portion of said arbor directly above said plate and fixed to said plate and having a setscrew clampingly engaging a selected portion of said arbor.

7. The tool defined in and according to claim 6, and wherein said plate is of an area greater than the outside diameter of said pipe, said collar being annular in plan and having a flat top depth measuring surface which is disposed in a plane at right angles to the axis of said arbor, and an exterior surface of said arbor having a graduated scale displayed thereon and adjustably cooperable with the top surface of said collar.

8. The tool defined in and according to claim 1, wherein said depth regulating and controlling means is adjustably mounted on a median portion of said arbor for abutting and resting upon a support surface for establishing and maintaining the locale of the cutting tool relative to the pipe.

* * * * *